(12) United States Patent
Mase

(10) Patent No.: US 6,965,642 B2
(45) Date of Patent: Nov. 15, 2005

(54) METHOD AND DEVICE FOR COMPRESSING AND DECOMPRESSING MOVING IMAGE DATA AND INFORMATION RECORDING MEDIUM

(75) Inventor: Katsuyoshi Mase, Shizuoka (JP)

(73) Assignee: NEC Corporation, Tokyo (JP)

( * ) Notice: Subject to any disclaimer, the term of this patent is extended or adjusted under 35 U.S.C. 154(b) by 912 days.

(21) Appl. No.: 09/984,455

(22) Filed: Oct. 30, 2001

(65) Prior Publication Data

US 2002/0051263 A1 May 2, 2002

(30) Foreign Application Priority Data

Oct. 31, 2000 (JP) ............................. 2000-332464

(51) Int. Cl.[7] ................................................ H04B 1/66
(52) U.S. Cl. ................................................ 375/240.03
(58) Field of Search ...................... 375/240.01, 240.02, 375/240.03, 240.04, 240.06, 240.14, 240.16; 348/409.1, 413.1; 382/57, 232; H04B 1/66

(56) References Cited

U.S. PATENT DOCUMENTS 5,121,448 A * 6/1992 Katayama et al. .......... 382/284

FOREIGN PATENT DOCUMENTS

| JP | H06-90444 A | 3/1994 |
| JP | H08-289290 A | 11/1996 |
| JP | 8-331367 | 12/1996 |
| JP | H10-13826 A | 1/1998 |
| JP | H11-41558 A | 2/1999 |
| JP | H11-331851 A | 11/1999 |

* cited by examiner

Primary Examiner—Tung Vo
(74) Attorney, Agent, or Firm—Sughrue Mion, PLLC

(57) ABSTRACT

A moving image data compressor/decompressor is provided that compresses moving image data with high compressibility and high image quality maintained. The image data extractor 8 extracts image data on a partial area with large motion in a frame. The first data compressor 10 compresses the image data on the partial area. The image reducer 12 reduces the size of the frame. The second data compressor compresses the data concerning the size-reduced frame. The compressed data output unit 16 holds data groups sequentially into the hard disk 208, together with positional information on a partial area. Each of the data groups is formed of frame data compressed by the second data compressor 14 and image data on a partial area compressed by the first data compressor 10, for each frame forming a moving image.

15 Claims, 5 Drawing Sheets

METHOD AND DEVICE FOR COMPRESSING AND DECOMPRESSING MOVING IMAGE DATA AND INFORMATION RECORDING MEDIUM

BACKGROUND OF THE INVENTION

The present invention relates to a moving image data compression/decompression method that compresses moving image data and decompresses the compressed moving image data into the original moving image data. The present invention relates to a moving image data compression/decompression device. Moreover, the present invention relates to a computer readable information recording medium on which a moving image data compression/decompression program is recorded.

Generally, image data has a large volume of information and requires a large memory capacity for storage and takes much time for data transmission. For that reason, various data compression techniques have been developed and used.

For data compression, realizing a compressibility as high as possible is important to reduce the memory capacity and transmission. Moreover, it is important to decrease degradation in image quality. However, it has been difficult to realize the high compressibility and high image quality at the same time. Various approaches have been made to solve such problems.

For example, JP-A No 331367/1996 discloses the technique of applying different data compression methods to the whole of an image and an important area of the image. For data compression, the whole of an image places importance on compressibility. An important area places importance on the image quality rather than compressibility.

Moreover, a moving image is created by displaying, in a switching mode, a frame, or a still image acting as a constituent unit, several tens times per second. Since each frame includes a large volume of information, data compression is particularly important to handle moving images. For example, the system in compliance with the MPEG (Motion Picture Experts Group) standard and the AVI (Audio Video Interleaved) by US Microsoft are used as the moving image compressing and expanding technique.

However, the existing moving image compression techniques such as MPEG system are not sufficient as to high compressibility and high quality. At present, there is a trade-off between both the characteristics.

SUMMARY OF THE INVENTION

The present invention is made to solve the above-mentioned problems. An object of the present invention is to provide a moving image compression/decompression method which is designed to realize both the high compressibility and high image quality.

Another object of the present invention is to provide a moving image compressor/decompressor which is designed to realize both the high compressibility and high image quality.

Further object of the present invention is to provide a computer readable information recording medium which records a moving image data compression/decompression program.

In order to achieve the above-mentioned objects, according to the present invention, a moving image data compression/decompression method, which compresses data on a moving image in units of frames each formed of a large number of pixels and decompresses compressed image data into an original moving image, comprises a data compression step and a data decompression step. The data compression step includes an image data extraction step of extracting image data on a previously specified partial area in the frame; a first data compression step of compressing the image data on the partial area extracted in the image data extraction step; an image reduction step of reducing the size of the frame by decreasing the number of pixels forming the frame; a second data compression step of compressing the data on the frame reduced in the image reduction step; and a compressed data outputting step of holding data groups sequentially into a memory, each of the data groups being formed of the data frame compressed in the second data compression step and the image data on the partial area compressed in the first data compression step, for each frame forming the moving image, and holding information representing a position of the partial area on said frame, into the memory, to create compressed moving image data. The data decompression step includes a compressed image data extraction step of separately extracting frame data and image data on the partial area, data-compressed for each frame, from the compressed moving image data stored in the memory; a first image decompression step of decompressing the compressed image data on the partial area, extracted in the compressed image data extraction step, into image data before compression; a second image decompression step of decompressing the compressed frame data extracted in the compressed image data extraction step, into frame data before compression; an image enlargement step of increasing the number of pixels forming the frame to create data concerning an enlarged frame from data decompressed in the second image decompression step, the size of the enlarged frame being represented by the decompressed data; and an image synthesis step of synthesizing, for each frame, the image data decompressed in the first image decompression step with the image data created in the image enlargement step to dispose an image represented by data decompressed in the first image decompression step at a position of the frame represented by positional information added to the moving image data.

Moreover, according to the present invention, a moving image data compressor/decompressor, which compresses data on a moving image in units of frames each formed of a large amount of pixels and decompresses compressed image data into an original moving image, comprises a data compressor and a data decompressor. The data compressor includes an image data extractor of extracting image data on a previously specified partial area in the frame; a first data compressor of compressing the image data on the partial area extracted in the image data extractor; an image reducer of reducing the size of the frame by decreasing the number of pixels forming the frame; a second data compressor of compressing the data on the frame reduced in the image reducer; and a compressed data outputting unit of holding data groups sequentially into a memory, each of the data groups being formed of the data frame compressed in the second data compressor and the image data on the partial area compressed in the first data compressor, for each frame forming the moving image, and holding information representing a position of the partial area of the frame, into the memory, to create compressed moving image data. The data decompressor includes a compressed image data extractor of separately extracting compressed frame data and image data on the partial area, data-compressed for each other, from the compressed moving image data stored in the memory; a first image decompressor of decompressing the compressed image data on the partial area, extracted in the compressed image data extractor, into image data before compression; a second image decompressor of decompressing the compressed frame data extracted in the compressed image data extractor, into frame data before compression; an image enlarger of increasing the number of pixels forming the frame to create data concerning an enlarged frame from data decompressed in the second image decompressor, the size of the enlarged frame being represented by the decompressed data; and an image synthesizer of synthesizing, for each frame, the image data decompressed in the first image decompressor with the image data created in the image enlarger to dispose an image represented by data decompressed in the first image decompressor at a position of the frame represented by positional information added to the moving image data.

Moreover, the present invention relates a computer readable information recording medium which records a moving image data compression/decompression program. The program is used for compressing data on a moving image in units of frames each formed of a large amount of pixels and decompressing compressed image data into an original moving image. The program includes a data compression step and a data decompression step. The data compression step includes an image data extraction step of extracting image data on a previously specified partial area in the frame; a first data compression step of compressing the image data on the partial area extracted in the image data extraction step; an image reduction step of reducing the size of the frame by decreasing the number of pixels forming the frame; a second data compression step of compressing the data on the frame reduced in the image reduction step; and a compressed data outputting step of holding data groups sequentially into a memory, each of the data groups being formed of the data frame compressed in the second data compression step and the image data on the partial area compressed in the first data compression step, for each frame forming the moving image, and holding information representing a position of the partial area on the frame, into the memory, to create compressed moving image data. The data decompression step includes a compressed image data extraction step of separately extracting compressed frame data and image data on the partial area, data-compressed for each frame, from the compressed moving image data stored in the memory; a first image decompression step of decompressing the compressed image data on the partial area, extracted in the compressed image data extraction step, into image data before compression; a second image decompression step of decompressing the compressed frame data extracted in the compressed image data extraction step, into frame data before compression; an image enlargement step of increasing the number of pixels forming the frame to create data concerning an enlarged frame from data decompressed in the second image decompression step, the size of the enlarged frame being represented by the decompressed data; and an image synthesis step of synthesizing, for each frame, the image data decompressed in the first image decompression step with the image data created in the image enlargement step to dispose an image represented by data decompressed in the first image decompression step at a position of the frame represented by positional information added to the moving image data.

Moreover, according to the moving image data compression/decompression method and the moving image data compression/decompression program recorded on a recording medium, image data on a previously specified partial area in the frame is extracted in the image data extraction step included in the data compression step. The image data on the partial area extracted in the image data extraction step is compressed in the first data compression step. The size of the frame is reduced in the image reduction step, by decreasing the number of pixels forming the frame. The data on the frame reduced in the image reduction step is compressed in the second data compression step. In the compressed data outputting step, data groups are sequentially held into a memory, each of the data groups being formed of the data frame compressed in the second data compression step and the image data on the partial area compressed in the first data compression step, for each frame forming the moving image, and information representing a position of the partial area on the frame, is held into the memory, to create compressed moving image data.

In the compressed image data extraction step in the data decompression step, frame data and image data on the partial area, data-compressed for each frame, is separately extracted from the compressed moving image data stored in the memory. In the first image decompression step, the compressed image data on the partial area, extracted in the compressed image data extraction step, is decompressed into image data before compression. In the second image decompression step, the compressed frame data extracted in the compressed image data extraction step, is decompressed into frame data before compression. In the image enlargement step, the number of pixels forming the frame is increased to create data concerning an enlarged frame from data decompressed in the second image decompression step, the size of the enlarged frame being represented by the decompressed data.

Thereafter, in the image synthesis step, the image data decompressed in the first image decompression step is synthesized, for each frame, with the image data created in the image enlargement step to dispose an image represented by data decompressed in the first image decompression step at a position of the frame represented by positional information added to the moving image data.

Moreover, in a moving image data compressor/decompressor according to the present invention, the image data extractor in the data compressor extracts image data on a previously specified partial area in the frame. The first data compressor compresses the image data on the partial area extracted in the image data extractor. The image reducer reduces the size of the frame by decreasing the number of pixels forming the frame. Thereafter, the second data compressor compresses the data on the frame reduced in the image reducer. The compressed data outputting unit holds data groups sequentially into a memory, each of the data groups being formed of the data frame compressed in the second data compressor and the image data on the partial area compressed in the first data compressor, for each frame forming the moving image, and holds information representing a position of the partial area of the frame, into the memory, to create compressed moving image data.

The compressed image data extractor in the data decompressor separately extracts compressed frame data and image data on the partial area, data-compressed for each other, from the compressed moving image data stored in the memory. The first image decompressor decompresses the compressed image data on the partial area, extracted in the compressed image data extractor, into image data before compression. The second image decompressor decompresses the compressed frame data extracted in the compressed image data extractor, into frame data before compression. The image enlarger increases the number of pixels forming the frame to create data concerning an enlarged frame from data decompressed in the second image decompressor, the size of the enlarged frame being represented by the decompressed data.

Thereafter, the image synthesizer synthesizes, for each frame, the image data decompressed in the first image decompressor with the image data created in the image enlarger to dispose an image represented by data decompressed in the first image decompressor at a position of the frame represented by positional information added to the moving image data.

As mentioned above, according to the present invention, since data is compressed with the size of a frame reduced, each frame of a moving image, or a moving image, can be data-compressed at high efficiency, compared with that in the prior art. Moreover, the partial area is data-compressed without shrinkage. Hence, when an area with large motion of a moving image, for example, of which the image quality is remarkably degraded, is specified as a partial area, it can be maintained at a high image quality. This feature allows both high compressibility and high image quality to be realized as a whole.

High-efficiency data compression to a frame is performed through data compression after size reduction. Hence, data can be compressed through both the process of merely reducing an image size and the existing scheme. This allows the process content to be very simplified.

Moreover, moving image data after data compression is reduced in size for each frame. For example, the moving image data contains data compressed in the existing scheme without any change. However, even if the moving image data decompressing system deals with only the existing data compression system, the moving image can be decompressed although the image quality may be degraded slightly.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, embodiments according to the present invention will be described below by referring to the attached drawings.

Figure 1:
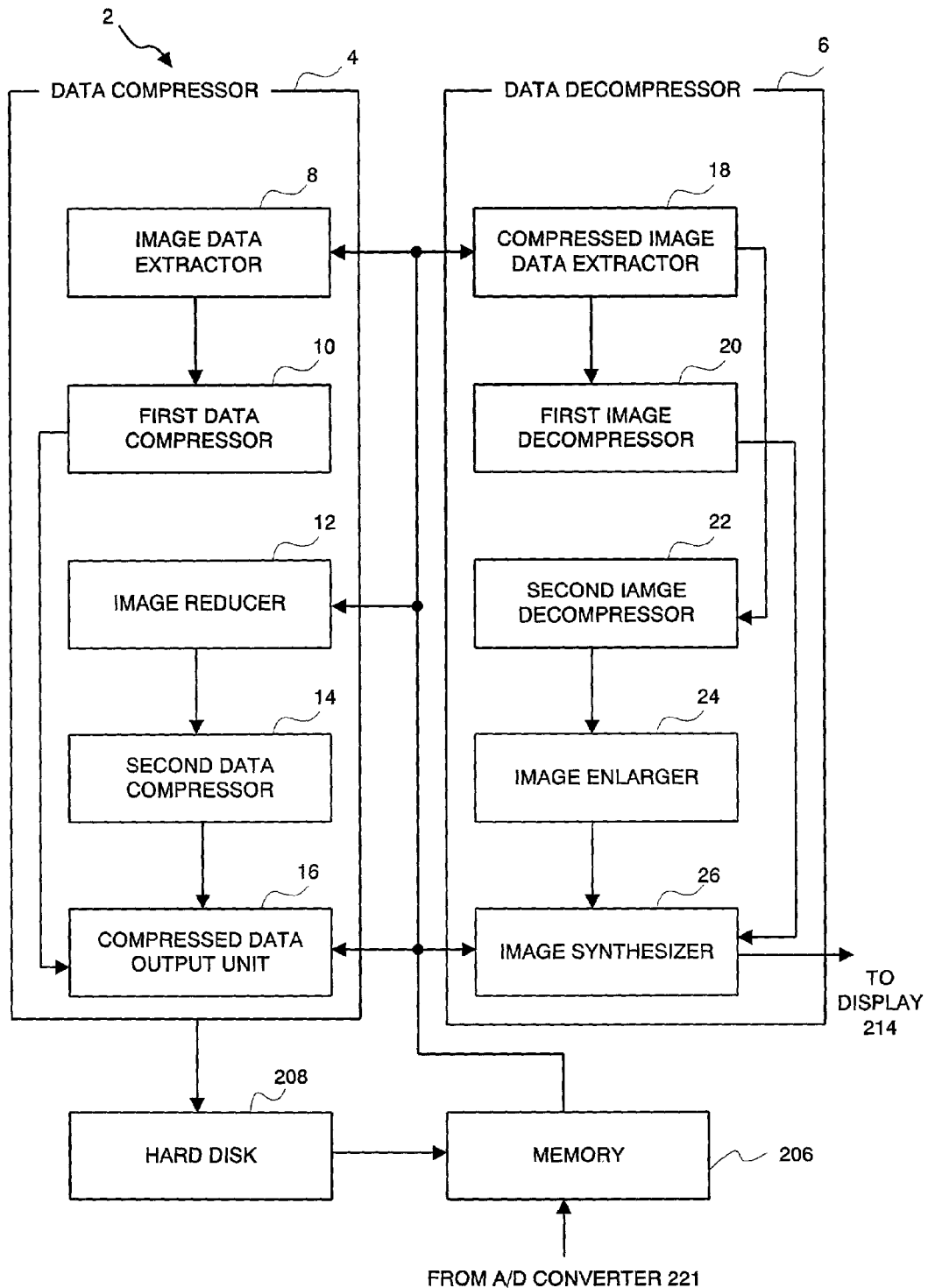
FIG. 1 is a functional block diagram illustrating a moving image data compressor/decompressor according to the present invention.
Figure 2:
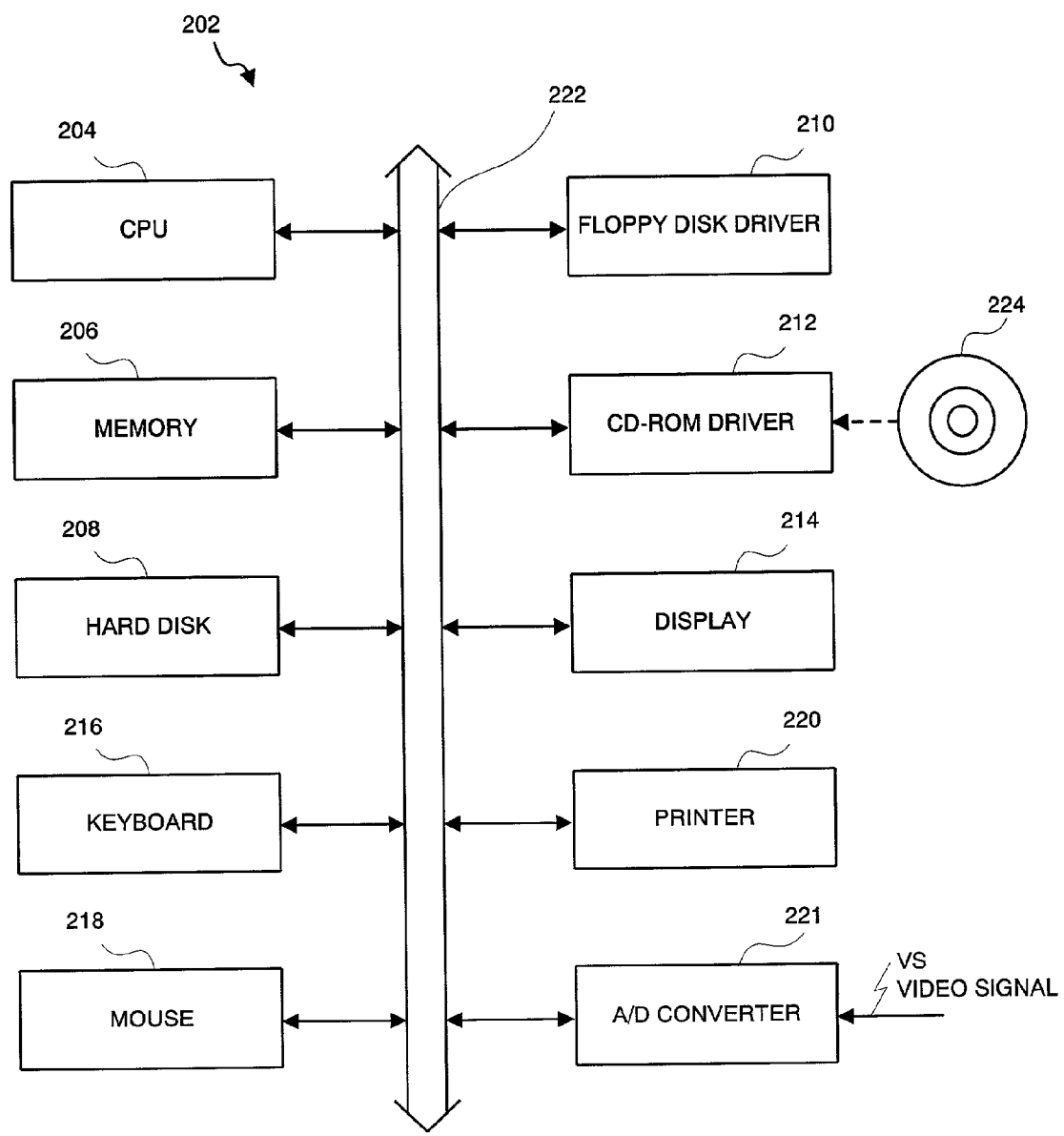
FIG. 2 is a block diagram illustrating a computer configuring the moving image data compressor/decompressor shown in FIG. 1.
Figure 3:
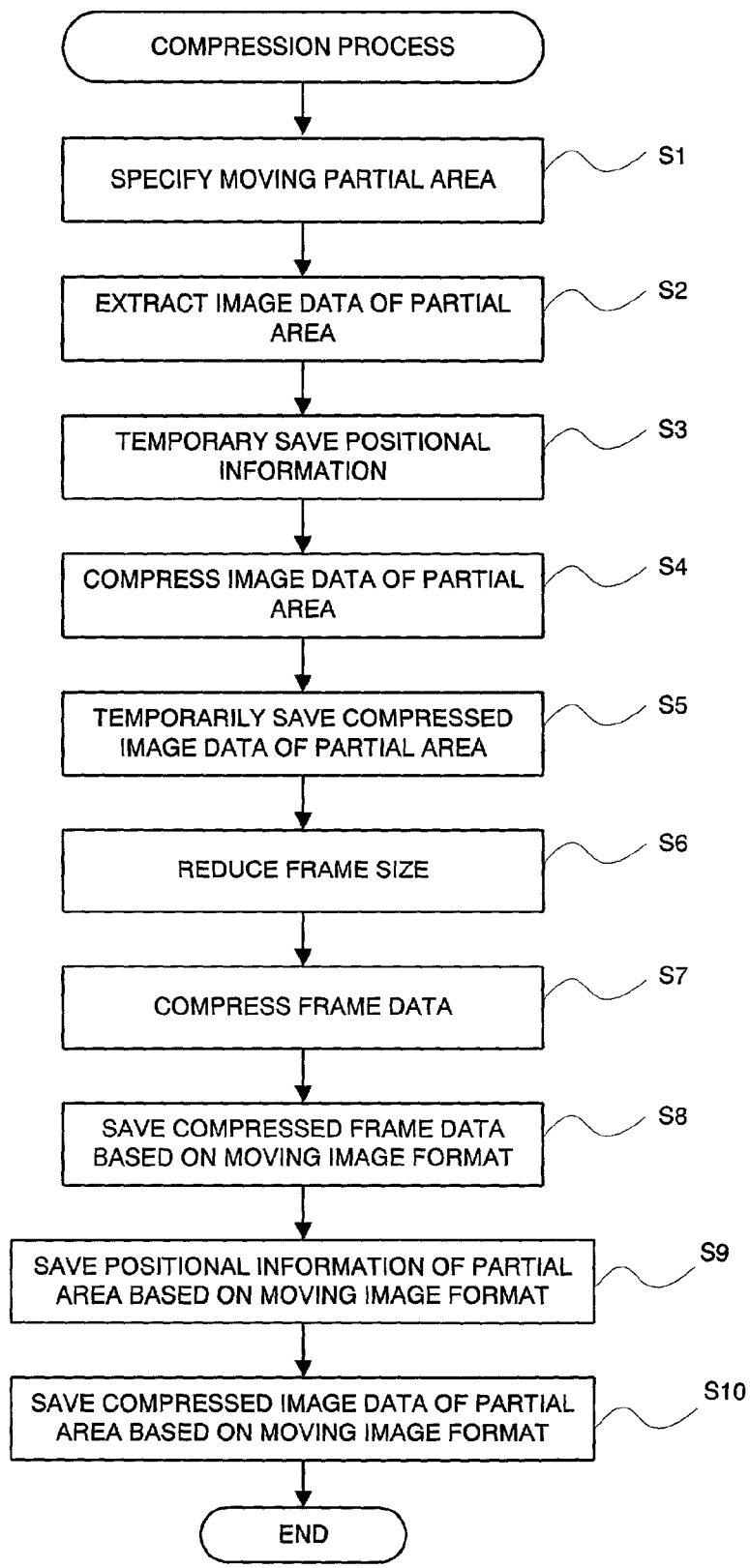
FIG. 3 is a flowchart showing the moving image data compressing operation of the moving image data compressor/decompressor in FIG. 1.
Figure 4:
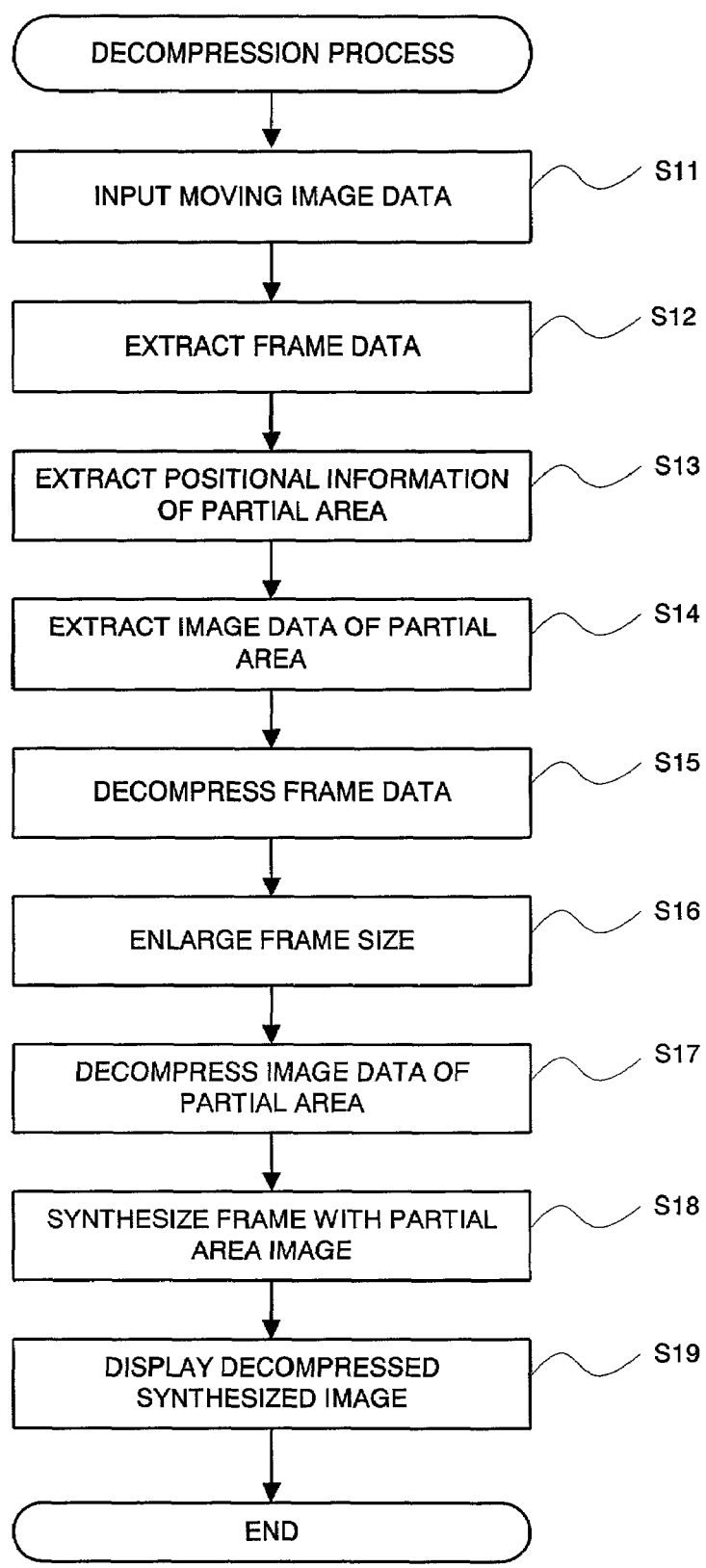
FIG. 4 is a flowchart showing the operation where the moving image data compressor/decompressor in FIG. 1 decompresses compressed data into a moving image.

FIG. 1 is a functional block diagram illustrating a moving image data compressor/decompressor according to the present invention. FIG. 2 is a block diagram illustrating a computer configuring the moving image data compressor/decompressor in FIG. 1. FIG. 3 is a flowchart showing the data compressing operation of the moving image data compressor/decompressor in FIG. 1. FIG. 4 is a flowchart showing the operation where the moving image data compressor/decompressor in FIG. 1 decompresses compressed data into a moving image. An example of a moving image data compressor/decompressor according to the present invention will be described here by referring to the figures. Moreover, both the moving image data compression/decompression method and the computer readable information recording medium on which a moving image data compression/decompression program is recorded, according to embodiments of the present invention, will be described here.

As shown in FIG. 2, a computer 202 configures a moving image data compressor/decompressor according to an embodiment. The computer 202 consists of a CPU (Central Processing Unit) 204, a memory 206, a hard disk 208, a floppy disk driver 210, a CD-ROM driver 212, a display 214, a keyboard 216, a mouse 218, a printer 220, an A/D converter 221, and a bus 222 interconnecting various elements.

A CD-ROM 224, or an example of an information recording medium, of the present invention, is incorporated in the CD-ROM driver 212. Under control of an operating system operated on the memory 206, a moving image data compression/decompression program, recorded on the CD-ROM 224, is loaded to the memory 206. Thus, the CPU 204 operates based on the program. The computer 202, particularly, the CPU 204 has the function of the moving image data compressor/decompressor. The moving image data compression/decompression program is loaded from the CD-ROM 224. Furthermore, the program, which is previously stored into the hard disk 208, for example, acting as another information recording medium of the present invention, may be loaded from the hard disk 208 into the memory 206.

The moving image data compressor/decompressor 2 configured of a computer is functionally shown in FIG. 1. The moving image data compressor/decompressor 2 includes data compressor 4 that compresses moving image data, in which a frame formed of a large number of pixels is handled as a unit, and the data decompressor 6 that decompresses compressed moving image data into the original moving image data.

The data compressor 4 is formed of an image data extractor 8, a first data compressor 10, an image reducer 12, a second data compressor 14, and a compressed data output unit 16.

The image data extractor 8 extracts image data on a partial area in a previously specified frame. The first data compressor 10 compresses image data on a partial area extracted by the image data extractor 8.

The image reducer 12 reduces the size of a frame by decreasing the number of pixels forming the frame. The second data compressor 14 compresses the frame data shrunk by the image reducer 12.

The compressed data output unit 16 holds data groups sequentially into the hard disk 208. Each of the data groups includes the frame data compressed by the second data compressor 14 and image data on a partial area compressed by the first data compressor 14, for each frame forming a moving image. Moreover, the compressed data output unit 16 holds information representing positions of a partial area on the frame into the hard disk 208, thus creating the compressed moving image data.

The data decompressor 6 includes a compressed image data extractor 18, a first image decompressor 20, a second image decompressor 22, an image enlarger 24, and an image synthesizer 26.

The compressed image data extractor 18 separately extracts compressed frame data and image data on a partial area, for each frame, from moving image data held in the memory 206. The first image decompressor 20 decompresses the partial area compressed image data, which is extracted by the compressed image data extractor 18, into image data before data compression.

The second image decompressor 22 decompresses the compressed frame data extracted by the compressed image data extractor 18 into image data before data compression. The image enlarger 24 increases the number of pixels constructing a frame and thus creates, from data decompressed by the second image decompressor 22, data enlarged to the size represented by the same data.

The image synthesizer 26 synthesizes the image data decompressed by the first image decompressor 20 and the image data created by the image enlarger 24. Thus the image represented by the data decompressed by the first image decompressor 20 is disposed, for each frame, at the position on a frame represented by the positional information to which the moving image data is added.

Next, the operation of the moving image data compressor/decompressor 2 having the above-mentioned configuration will be explained below.

Figure 5:
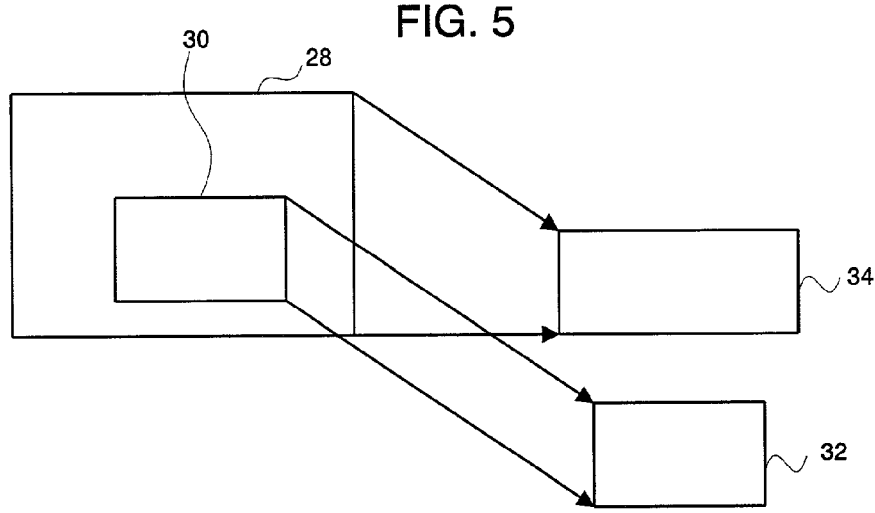
FIG. 5 is a schematic diagram explaining extraction of a partial area image from a frame as well as reduction of a frame size.
Figure 6:
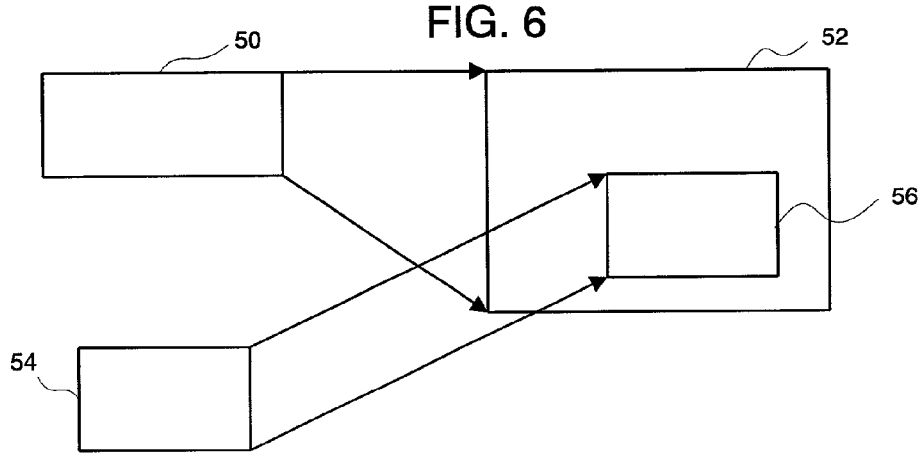
FIG. 6 is a schematic diagram showing the operation of restring a partial area image to an original frame as well as the process of decompressing a reduced frame into an original frame.
Figure 7:
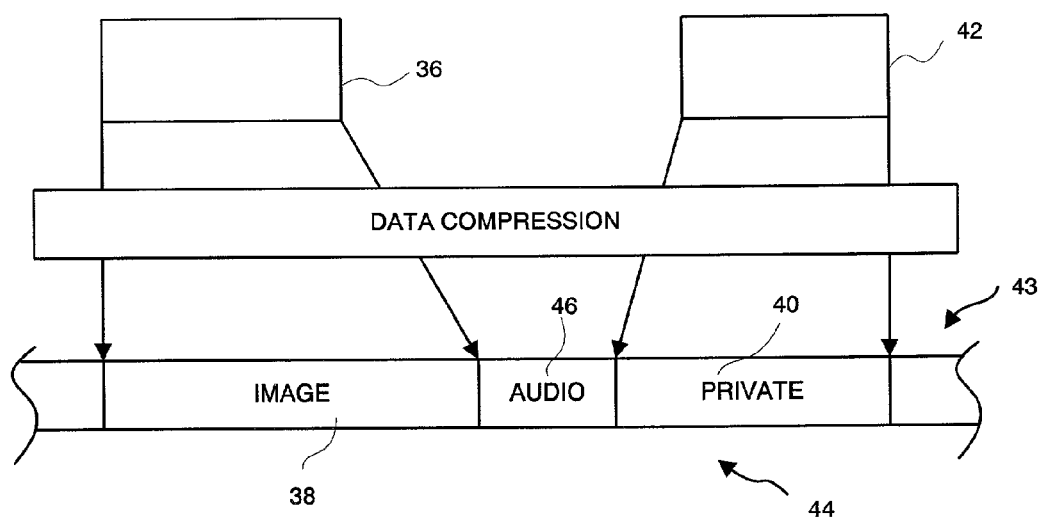
FIG. 7 is a schematic diagram showing creation of compressed moving image data.

FIG. 5 is a schematic diagram illustrating extraction of a partial area image from a frame and reduction of the size of a frame. FIG. 6 is a schematic diagram illustrating the operation of restoring a partial area image into an original frame and the operation of decompressing a reduced frame into an original frame. FIG. 7 is a schematic diagram illustrating creation of compressed moving image data. Explanation will be made below by suitably referring to these figures.

First, the moving image data compression operation of the data compressor 4 will be explained below.

The CPU 204 operates based on a predetermined program stored in the memory 206. The CPU 204 controls the A/D converter 221 converts the video signal VS in the form of a digital signal and stores the result into the memory 206. When the memory 206 has a sufficiently large memory capacity, it can store the whole data corresponding to a moving image at a time. When the memory 206 does not have its sufficient memory capacity, it takes in image data for several frames at a time. Thereafter, the subsequent processes are performed.

In such an operation, after the memory 206 stores data for each frame of a moving image, the CPU 204 operates based on the predetermined program stored in the memory. The image data held in the memory 206 is used to display an image (a still image or a moving image) on the display 214. While viewing the image, the operator specifies a rectangular area with large motion on the screen of the display 214, based on the content of the image, using, for example, a mouse 218. The CPU 204 captures the positional information concerning the specified area acting as the partial area and then it stores into the memory 206 (Step S1 in FIG. 3).

The positional information may be related to, for example, the left upper corner of a partial area, a coordinate value on an image, the width and height of the partial area, or the coordinate values of two opposing corners of the partial area. The technique of specifying a specific area on an image displayed on the screen using the mouse 218 to capture the positional information is well known. Hence, the detailed explanation will be omitted here.

In succession, the image data extractor 8 reads out the positional information on a partial area stored in the memory 206 from the memory 206. Then, the image data extractor 8 extracts the image data 32 on the partial area 30 from the data in the first frame 28 (FIG. 5) of a moving image stored in the memory 206, based on the positional information (step S2). Later, the image data extractor 8 temporarily stores the positional information as positional information to be stored based on a predetermined moving image format, into a predetermined recording area of the memory 206 (step S3).

The first data compressor 10 compresses image data on each partial area, in accordance with, for example, the MPEG standard (step S4). After compression, the memory 206 temporarily stores the image data (step S5).

In succession, the image reducer 12 decreases the number of pixels constructing the frame to reduce the (whole) size of the frame 28. Thus, the image data on the reduced frame 34 is obtained (step S6). In this case, the area of the image can be shrunk to ¼ by, for example, thinning horizontal pixels or vertical pixels every other pixel.

Thereafter, the second data compressor 14 compresses data on the frame reduced by the image reducer 12 (step S7). The compressed data output unit 16 reads out the frame data 36 compressed by the second data compressor 14 from the memory 206. Then, the second data compressor 14 stores the frame data 36 into a predetermined memory area corresponding to the image packet 38 in the hard disk 208. Later, the frame data 36 is disposed to the image packet 38 in accordance with the moving image format based on the MPEG standard, as shown in FIG. 7 (step S8). Moreover, the second data compressor 14 reads out the positional information on the partial area from the memory 206 and then stores it into the predetermined memory area of the hard disk 208. Thus, the positional information is disposed to a predetermined position of the private packet 40 of which its use is not specified, following the image packet 38 (step S9). Moreover, the compressed data output unit 16 reads out the image data 42 on the partial area compressed by the first data compressor 10 and then dispose it to the private packet 40, that is, stores it into the predetermined memory area corresponding to the private packet 40 in the hard disk 208.

Thus, the compressed moving image data 44 for one frame in the compressed moving image data 43 is formed (step S10).

The moving image format in compliance with the MPEG standard can include audio information. When there is audio information, compressed audio information may be suitably inserted in the audio packet 46 between the image packet 38 and the private packet 40, as shown in FIG. 7. In such a case, the CPU 204 is previously operated based on a predetermined program and acquires audio information using the A/D converter 221 and then performs a compression process on the memory 206. Finally, the CPU 204 stores the compressed data into the memory area corresponding to the audio packet 46 in the hard disk 208.

In the data compressor 4, each element sequentially repeats the above-mentioned operation to the second frame and to the following frames. As a result, the hard disk 208 stores compressed data concerning the whole moving image.

Next, the moving image data decompression operation of the data compressor 6 will be explained below.

First, the CPU 204 reads out the compressed moving image data from the hard disk 208 and then holds it in the memory 206 (step S11).

The data decompressor 6 subjects each data group of image data included in image packet 38 and the image data included in the private packet 40 in the moving image format, to a decompression process.

In a concrete explanation, the compressed image data extractor 18 separately extracts the compressed data frame, partial area positional information, and partial area image data in the first frame, from both the image packet 38 and the private packet 40 of the moving image data held in the memory 206 (steps S12, S13 and S14).

The second image demodulator 22 decompresses the compressed frame data extracted by the compressed image data extractor 18 into frame data before data compression (step S15). The image enlarger 24 increases the number of pixels constructing a frame and thus creates data of the frame 52 from the data decompressed by the second image decompressor 22 (step S16). The frame 52 is enlarged from the frame 50 (FIG. 6) and is represented by the data decompressed by the second image decompressor 22.

With the area of a frame reduced to, for example, ¼ in data compression, a pixel with the same value as one of a pair of neighboring pixels in the horizontal direction is intentionally inserted between the neighboring pixel pair. Meanwhile, a pixel with the same value as one of a pair of neighboring pixels in the vertical direction is intentionally inserted between the neighboring pixel pair. The value of the inserted pixel may be set to the average value of the values of two neighboring pixels. The pixel value is a value representing the color or brightness of a pixel. When the pixel value represents color, the value of one pixel is generally represented by a combination of values of three primary colors respectively corresponding to red, blue, and green.

The first image decompressor 20 decompresses the compressed image data on a partial area, extracted by the compressed image data extractor 18, into image data before data compression (step S17).

The image synthesizer 26 synthesizes image data decompressed by the first image decompressor 20 with image data created by the image enlarger 24 (step S18). Thus, the image 54 represented by the data decomposed by the first image decompressor 20 is disposed in the partial area 56 in a frame represented by the extracted positional information (FIG. 6).

The image synthesizer 26 supplies the synthesized image data for one frame to display it on the display 214 (step S19).

In the data decompressor 6, each element repeats the above-mentioned operation sequentially to the data concerning the second and successive frames of moving image data stored in the memory 206. As a result, all the original moving image data are decompressed while the moving image is displayed on the display 214.

As described above, the moving image data compressor/decompressor 2 of the present embodiment performs data compression with the frame size reduced. Hence, each frame of a moving image, or a moving image, can be data-compressed with high efficiency, compared with that in the prior art. Moreover, since data compression is performed without reducing the partial area, the fast moving portion can be maintained in high image quality. This allows both high compressibility and high image quality to be compatible with each other as a whole.

High-efficiency data compression to a frame is carried out after reduction of the data size. Hence, the data compression is performed by merely reducing the image size and by performing the existing data compression scheme. This makes the process content to be very simplified.

Moving image data after data compression contains the data reduced and compressed for each frame, without any change. Hence, even when the moving image data decompression system can be dealt with only the existing data compression scheme, the moving image can be decompressed although the image quality is degraded slightly.

As shown in FIG. 7, in the moving image format in compliance with the MPEG standard, the compressed data of a partial area in the present embodiment is disposed in the private packet 40 of which the use is not specified. The image data of the whole frame, which is shrunk and is compressed based on the MPEG standard, is disposed in the image packet 38. Therefore, the system, which handles only the moving image data compressed based on the MPEG standard, merely ignores the data of the private packet 40 and can decompress moving image data from only the data of the image packet 38.

In this embodiment, an operator specifies the partial area using the mouse 218. However, the configuration may be configured that automatically specifies a fast moving portion in a moving image to determine a partial area in a frame. In this configuration, a moving image data compression/decompression program has the partial area detection step of specifying an area in a frame representing a fast moving video image based on a difference in image data between successive frames and specifying the area as a partial area. The CPU 204, which constructs a partial area detector, detects the partial area on the frame in the step S1.

The technique of creating a P picture when data compression is performed with, for example, the MPEG scheme may be used as a specific technique of detecting an area with large motion such as a moving image.

In the present embodiment, the hard disk 208 within the computer stores the moving image data after compression. However, the moving image data after compression may be outputs onto the Internet, whereby it may be stored in, for example, the memory in a server connected to the Internet.

There are various types of video signal suppliers. A video tape recorder, video camera, TV-tuner, or the like may capture video signals to carry out the data compression.

According to the present invention described above, the moving data compression/decompression method or a moving image data compression/decompression program recorded on the information recording medium includes the following steps. In the image data extraction step of the data compression step, the image data on a previously specified partial area in a frame is extracted. In the first data compression step, the image data on a partial area extracted in the image data extraction step is compressed. In the image reduction step, the number of pixels forming a frame is decreased so that the frame size is reduced. In the second data compressions step, the frame data shrunk in the image reduction step is compressed. In the compressed data output step, data groups are sequentially stored into the memory. Each of the data groups is formed frame data compressed in the second data compression step and image data on the partial area compressed in the first data compression step for each frame constructing a moving image. The memory further stores information representing the position of the partial area in a frame and forms compressed moving image data.

In the compressed image data extraction step of the data decompression step, both the frame data and the partial area image data, compressed for each frame, are separately extracted from compressed moving image data stored in the memory. In the first image decompression step, image data before compression is decomposed from the compressed image data on the partial area, extracted in the compressed image data extraction step. In the second image decompression step, frame data before compression is decomposed from the compressed frame data extracted in the compressed image data extraction step. In the image enlargement step, the number of pixels constructing the frame is increased to create data on a frame from data decompressed in the second image decompression step. The frame is represented by the decompressed data and the size of the frame is enlarged.

Thereafter, in the image synthesis step, the image data decompressed in the first image decompression step is synthesized with the image data created in the image enlargement step, for each frame. Thus, an image represented by data decompressed in the first image decompression step is disposed at a position on the frame represented by positional information added to the moving image data.

Moreover, in the moving image data compressor/decompressor, the image data extractor in the data compressor extracts image data on a previously specified partial area of a frame. The first data compressor compresses the image data on the partial area extracted by the image data extractor. The image reducer reduces the size of the frame by decreasing the number of pixels forming the frame. Thereafter, the second data compressor compresses the data on the frame reduced in the image reducer. The compressed data output unit holds data groups sequentially into a memory for each frame forming the moving image, and holds information representing a position on the frame of the partial area, into the memory, to create compressed moving image data. Each of the data groups is formed of the frame data compressed in the second data compressor and the image data on the partial area compressed in the first data compressor.

The compressed image data extractor in the data compressor separately extracts the compressed frame data and the image data on the partial area from the compressed moving image data stored in the memory, for each frame. The first image decompressor decompresses the compressed image data on the partial area, extracted by the compressed image data extractor, into image data before compression. The second image decompressor decompresses the compressed frame data extracted by the compressed image data extractor, into frame data before compression. The image enlarger increases the number of pixels forming the frame to create data of a frame from data decompressed in the second image decompressor. The frame is represented by the decompressed data and the size of the frame is enlarged.

Thereafter, the image synthesizer synthesizes, for each frame, the image data decompressed in the first image decompressor with the image data created in the image enlarger. Thus, an image represented by data decompressed by the first image decompressor is disposed at a position of the frame represented by positional information added to the moving image data.

According to the present invention as described above, data compression can be performed, with the frame size reduced, so that each frame of a moving image, or a moving image, can be data-compressed higher efficiency, compared with that in the prior art. Moreover, since a partial area is subjected to data compression without any reduction, the portion with large motion, for example, in a moving image, in which degradation in image quality tends to be remarkable, can be maintained in high image quality if it is specified as a partial portion. This feature allows high compressibility and high image quality to be compatible as a whole.

Moreover, the high-efficiency data compression is performed to a frame after data size reduction. Hence, this data compression can be realized by performing both the simple image-size reduction process and data compression in accordance with the existing scheme. Hence, this method provides very simplified process contents.

Moreover, moving image data after data compression contains the data size-reduced or compressed though the existing scheme, for each frame, without any change. Hence, even if the system of decompressing moving image data can deal with only the existing data compression scheme, the moving image can be decompressed although the image quality may be degraded somewhat.

The entire disclosure of Japanese Application No. 2000-332464 filed Oct. 31, 2000 including specification, claims, drawings and summary are incorporated herein by reference in its entirely.

What is claimed is:

1. A moving image data compression/decompression method, which compresses data on a moving image in units of frames each formed of a large number of pixels and decompresses compressed image data into an original moving image, comprising a data compression step and a data decompression step;

said data compression step including:
   an image data extraction step of extracting image data on a previously specified partial area in said frame;
   a first data compression step of compressing said image data on said partial area extracted in the image data extraction step;
   an image reduction step of reducing the size of said frame by decreasing the number of pixels forming said frame;
   a second data compression step of compressing said data on said frame reduced in the image reduction step; and
   a compressed data outputting step of holding data groups sequentially into a memory, each of said data groups being formed of said data frame compressed in said second data compression step and said image data on said partial area compressed in said first data compression step, for each frame forming said moving image, and holding information representing a position of said partial area on said frame, into said memory, to create compressed moving image data;

said data decompression step including:
   a compressed image data extraction step of separately extracting frame data and image data on said partial area, data-compressed for each frame, from said compressed moving image data stored in said memory;
   a first image decompression step of decompressing said compressed image data on said partial area, extracted in said compressed image data extraction step, into image data before compression;
   a second image decompression step of decompressing said compressed frame data extracted in said compressed image data extraction step, into frame data before compression;
   an image enlargement step of increasing the number of pixels forming said frame to create data concerning an enlarged frame from data decompressed in said second image decompression step, the size of said enlarged frame being represented by said decompressed data; and an image synthesis step of synthesizing, for each frame, said image data decompressed in said first image decompression step with said image data created in said image enlargement step to dispose an image represented by data decompressed in said first image decompression step at a position of said frame represented by positional information added to said moving image data.

2. The moving image data compression/decompression method defined in claim 1, wherein said partial area in said frame represents a video image with large motion.

3. The moving image data compression/decompression method defined in claim 2, further comprising a partial area detection step of specifying an area in said frame representing a video image with large motion, based on a difference in said image data between successive frames, and determining said area as said partial area.

4. The moving image data compression/decompression method defined in claim 1, wherein said partial area has a rectangular form.

5. The moving image data compression/decompression method defined in claim 1, wherein said compressed data outputting step comprises the steps of outputting said moving image data through a communication line and holding it into said memory.

6. A moving image data compressor/decompressor, which compresses data on a moving image in units of frames each formed of a large amount of pixels and decompresses compressed image data into an original moving image, comprising a data compressor and a data decompressor;

said data compressor including:
an image data extractor of extracting image data on a previously specified partial area in said frame;
a first data compressor of compressing said image data on said partial area extracted in the image data extractor;
an image reducer of reducing the size of said frame by decreasing the number of pixels forming said frame;
a second data compressor of compressing said data on said frame reduced in the image reducer; and
a compressed data outputting unit of holding data groups sequentially into a memory, each of said data groups being formed of said data frame compressed in said second data compressor and said image data on said partial area compressed in said first data compressor, for each frame forming said moving image, and holding information representing a position of said partial area of said frame, into said memory, to create compressed moving image data;

said data decompressor including:
a compressed image data extractor of separately extracting compressed frame data and image data on said partial area, data-compressed for each other, from said compressed moving image data stored in said memory;
a first image decompressor of decompressing said compressed image data on said partial area, extracted in said compressed image data extractor, into image data before compression;
a second image decompressor of decompressing said compressed frame data extracted in said compressed image data extractor, into frame data before compression;

an image enlarger of increasing the number of pixels forming said frame to create data concerning an enlarged frame from data decompressed in said second image decompressor, the size of said enlarged frame being represented by said decompressed data; and an image synthesizer of synthesizing, for each frame, said image data decompressed in said first image decompressor with said image data created in said image enlarger to dispose an image represented by data decompressed in said first image decompressor at a position of said frame represented by positional information added to said moving image data.

7. The moving image data compressor/decompressor defined in claim 6, wherein said partial area of said frame represents a video image with large motion.

8. The moving image data compressor/decompressor defined in claim 7, further comprising a partial area detector of specifying an area in said frame representing a video image with large motion, based on a difference in said image data between successive frames, and determining said area as said partial area.

9. The moving image data compressor/decompressor defined in claim 6, wherein said partial area has a rectangular form.

10. The moving image data compressor/decompressor defined in claim 6, wherein said compressed data outputting unit outputs said moving image data through a communication line and holds it into said memory.

11. A computer readable information recording medium which records a moving image data compression/decompression program, said program being used for compressing data on a moving image in units of frames each formed of a large amount of pixels and decompressing compressed image data into an original moving image, said program including a data compression step and a data decompression step;

said data compression step including:
an image data extraction step of extracting image data on a previously specified partial area in said frame;
a first data compression step of compressing said image data on said partial area extracted in the image data extraction step;
an image reduction step of reducing the size of said frame by decreasing the number of pixels forming said frame;
a second data compression step of compressing said data on said frame reduced in the image reduction step; and
a compressed data outputting step of holding data groups sequentially into a memory, each of said data groups being formed of said data frame compressed in said second data compression step and said image data on said partial area compressed in said first data compression step, for each frame forming said moving image, and holding information representing a position of said partial area on said frame, into said memory, to create compressed moving image data;

said data decompression step including:
a compressed image data extraction step of separately extracting compressed frame data and image data on said partial area, data-compressed for each frame, from said compressed moving image data stored in said memory;
a first image decompression step of decompressing said compressed image data on said partial area, extracted in said compressed image data extraction step, into image data before compression;

a second image decompression step of decompressing said compressed frame data extracted in said compressed image data extraction step, into frame data before compression;

an image enlargement step of increasing the number of pixels forming said frame to create data concerning an enlarged frame from data decompressed in said second image decompression step, the size of said enlarged frame being represented by said decompressed data; and an image synthesis step of synthesizing, for each frame, said image data decompressed in said first image decompression step with said image data created in said image enlargement step to dispose an image represented by data decompressed in said first image decompression step at a position of said frame represented by positional information added to said moving image data.

12. The computer readable information recording medium defined in claim 11, wherein said partial area in said frame represents a video image with large motion.

13. The computer readable information recording medium defined in claim 12, further comprising a partial area detection step of specifying an area in said frame representing a video image with large motion, based on a difference in said image data between successive frames, and determining said area as said partial area.

14. The computer readable information recording medium defined in claim 11, wherein said partial area has a rectangular form.

15. The computer readable information recording medium defined in claim 11, wherein said compressed data outputting step comprises the steps of outputting said moving image data through a communication line and holding it into said memory.

* * * * *